(12) United States Patent
Sakakibara

(10) Patent No.: US 9,925,462 B2
(45) Date of Patent: Mar. 27, 2018

(54) GAME DEVICE, GAME DEVICE CONTROL METHOD, AND RECORDING MEDIUM

(71) Applicant: CAPCOM Co., Ltd., Osaka (JP)

(72) Inventor: Kazuki Sakakibara, Osaka (JP)

(73) Assignee: CAPCOM CO., LTD., Osaka-Shi, Osaka (JP)

( * ) Notice: Subject to any disclaimer, the term of this patent is extended or adjusted under 35 U.S.C. 154(b) by 83 days.

(21) Appl. No.: 14/914,437

(22) PCT Filed: Sep. 10, 2014

(86) PCT No.: PCT/JP2014/073946
§ 371 (c)(1),
(2) Date: Feb. 25, 2016

(87) PCT Pub. No.: WO2015/041120
PCT Pub. Date: Mar. 26, 2015

(65) Prior Publication Data
US 2016/0199734 A1 Jul. 14, 2016

(30) Foreign Application Priority Data

Sep. 18, 2013 (JP) .................................. 2013-192916
Aug. 12, 2014 (JP) .................................. 2014-164254

(51) Int. Cl.
*G06F 17/00* (2006.01)
*A63F 13/47* (2014.01)
(Continued)

(52) U.S. Cl.
CPC .............. *A63F 13/47* (2014.09); *A63F 13/52* (2014.09); *A63F 13/65* (2014.09); *A63F 13/69* (2014.09); *A63F 13/822* (2014.09); *A63F 13/825* (2014.09)

(58) Field of Classification Search
CPC .......... A63F 13/47; A63F 13/69; A63F 13/52; A63F 13/825; A63F 13/65; A63F 13/822
See application file for complete search history.

(56) References Cited

U.S. PATENT DOCUMENTS 6,319,129 B1 * 11/2001 Igarashi .................. A63F 13/10
345/418
6,347,995 B1 * 2/2002 Igarashi .................. A63F 13/10
273/153 R
(Continued)

FOREIGN PATENT DOCUMENTS

EP 1 088 574 A1 4/2001
EP 1 862 973 A1 12/2007
(Continued)

OTHER PUBLICATIONS

Ismail, Rami. Random level generation in Wasteland Kings. rami-ismail.squarespace.com. Online. Apr. 2, 2013. Accessed via the Internet. Accessed Aug. 5, 2017. <URL: http://rami-ismail.squarespace.com/blog/2013/04/02/random-level-generation-in-wasteland-kings>.*
(Continued)

*Primary Examiner* — Dmitry Suhol
*Assistant Examiner* — Carl V Larsen
(74) *Attorney, Agent, or Firm* — IP Business Solutions, LLC

(57) ABSTRACT

A drill unit 111 expands a dungeon based on a parameter in two directions from the starting point X and selects a start S and a goal G from each area expanded in two directions. Thus, it is possible to generate a path from the start S to the goal G passing through the starting point X. Moreover, it is possible to determine a board form of the whole dungeon by determining expanding directions with the parameter.

12 Claims, 22 Drawing Sheets

(51) Int. Cl.
    *A63F 13/825* (2014.01)
    *A63F 13/52* (2014.01)
    *A63F 13/69* (2014.01)
    *A63F 13/822* (2014.01)
    *A63F 13/65* (2014.01)

(56) References Cited

U.S. PATENT DOCUMENTS

| | | | | |
|---|---|---|---|---|
| 2004/0224759 | A1* | 11/2004 | Nishimura | A63F 13/10 463/31 |
| 2009/0036206 | A1* | 2/2009 | Nagayama | A63F 13/10 463/31 |

FOREIGN PATENT DOCUMENTS

| | | | |
|---|---|---|---|
| JP | 11-144087 | A | 5/1999 |
| JP | 2001-96067 | A | 4/2001 |
| JP | 3270929 | B | 4/2002 |
| JP | 2004-329697 | A | 11/2004 |
| JP | 2008-136693 | A | 6/2008 |

OTHER PUBLICATIONS

Wasteland Kings. vlambeer.itch.io. Online. Accessed via the Internet. Accessed Aug. 5, 2017. <URL: https://vlambeer.itch.io/wasteland-kings>.*

Wasteland Kings—PAX Prime 2013. Youtube.com. Online. Sep. 2, 2013. Accessed via the Internet. Accessed Aug. 5, 2017. <URL: https://www.youtube.com/watch?v=sKgspBY8boc>.*

Smith, Adam. A Map Generation Speedrun with Answer Set Programming. eis-blog.soe.ucsc.edu. Online. Oct. 4, 2011. Accessed via the Internet. Accessed Aug. 5, 2017. <URL: https://eis-blog.soe.ucsc.edu/2011/10/map-generation-speedrun/>.*

The European Search Report dated Jun. 20, 2017 in the counterpart European application.

Kazuto Kurosawa, "John Sugaku Nyumon", 1st edition, 1st print, Kyoritsu Shuppan Co., Ltd., Mar. 1, 1995, p. 109.

SmokingWOLF, "WOLF RPG Editor de Hajimeru Game Seisaku", 1st edition, 2nd print, Kabushiki Kaisha Kogakusha, Dec. 25, 2011, pp. 156 to 164.

* cited by examiner

1

GAME DEVICE, GAME DEVICE CONTROL METHOD, AND RECORDING MEDIUM

FIELD OF THE INVENTION

Technical Field

The present invention relates to a method for automatic generation of a game space on which a player character acts.

Background of the Invention

A game space such as a dungeon where the player character explores is generated automatically in some game. In such games, dungeons are newly generated every time so that users can explore in the dungeon with surprise.

General method for automatic generation of the game space is generating a path between partitions (rooms) at random after generating a plurality of predetermined partitions. A staircase is set in any room so that the player character can go upstairs or downstairs.

In the general method for automatic generation of the game space, when the structure of the dungeon is not straight, it is difficult to specify the point that every player character inevitably passes along.

It is difficult to control an arrangement or size of the room, while it is difficult to reflect intention of developers to the map generated in the general method.

SUMMARY OF THE INVENTION

The present invention provides automatic generation of the game space reflected the intention of the developers.

A game device generating an activity space, the game device including: a monitor displaying a game screen; a controller input operation by a user; a memory on which data is stored; a storing unit storing a parameter indicating a percentage in each direction to generate the activity space on the memory; an activity space generating unit generating the activity space in at least two different directions from a starting point in a virtual game space at random based on the parameter; a setting unit setting at least one start and at least one goal in each activity space generated in different directions; a controlling unit moving game characters in the activity space in response to an operation signal input from the controller; and a rendering unit rendering the game screen including the activity space and the game characters and displaying the game screen on the monitor, wherein the activity space is the virtual game space where the game characters can act.

According to the present invention, it is possible to generate the activity space absolutely including the starting point between the start and the goal by generating the activity space at random based on the predetermined parameter in at least two different directions from the starting point in the virtual space and setting the start and the goal in each activity space generated in different directions. Moreover, the direction to generate the activity space is determined by the parameter, it is possible to provide automatic generation of the game space reflected the intention of the developers.

DESCRIPTION OF EMBODIMENTS

Hereinafter, it will be described one embodiment of the present invention with reference to the drawings.

Figure 1:
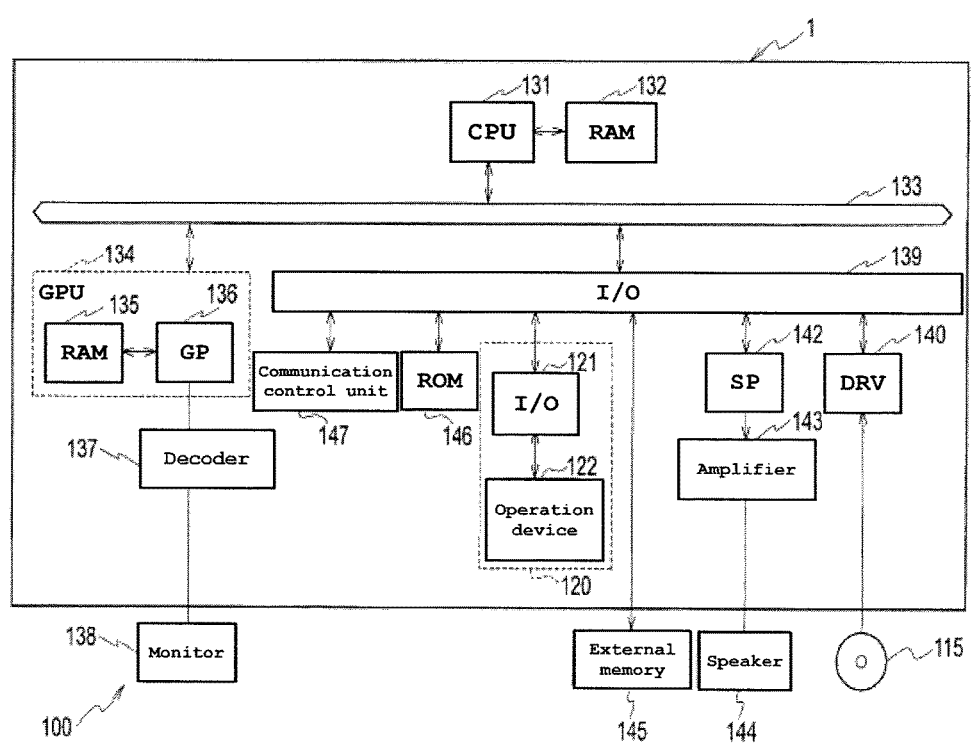
FIG. 1 is a diagram of a configuration of hardware in a game device according to one embodiment of the present invention.

(GAME SYSTEM) A game system 100 executing the game program relating to one embodiment of the present invention will be described with reference to the FIG. 1. The game system 100 includes a game console (a game device, a computer) 1, an external monitor 138 (a monitor), a speaker 144, an external memory 145, and a storage medium 148.

The game console 1 is a general game device includes a controller 120, a Central Processing Unit (CPU) 131 (a controlling unit), a Random Access Memory (RAM) 132 (a memory), a bus 133, a Graphics Processing Unit (GPU) 134 (included in a rendering unit), a decoder 137 (included in the rendering unit), an Input/Output Port (I/O port) 139, a Drive (DRV) 140, a Sound Processor (SP) 142, an amplifier 143, a Read Only Memory (ROM) 146, and a communication control unit 147. The CPU 131 controls whole process. The RAM 132 stores data corresponding to the progress of the game. The ROM 146 boots the game console 1 and stores the system program executing basic functions of the game console 1. The GPU 134 including a Graphics Processor (GP) 136 and a RAM 135 renders the game space and objects in the game space.

One embodiment of the game program executed on the game console 1 is described. However the present invention is not so limited. The game program can be executed on any computer including the CPU and the memory etc.

In this embodiment of the present invention, the game program is stored on the storage medium 148. The game console 1 reads out the game program from the storage medium 148 inserted to the DRV 140 and executes the game program. The game image (game screen) of the game space rendered by the GPU 134 will be output on the monitor 138 via the decoder 137. Sound effects and music processed on the SP 142 will be output on the speaker 144 via the amplifier 143. The storage medium 148 can be, for example, a DVD, a CD, and a hard disc etc. When the game console 1 is connected to a communication network, the storage medium 148 can be on the communication network. When the game console 1 is connected to the communication network, the communication control unit 147 controls the communication.

The controller 120 is connected to the game console 1 with wire or wireless. When the user operates an operation device 122 such as operation buttons and sticks on the controller 120, operation signal input by the user will be output to the game console 1 via an I/O port 121 of the controller 120. The CPU 131 receives the operation signal via the I/O port 139 and controls a player character and the game space corresponding to the operation signal. The operation signal is commands relates to the game play such as selecting menu and causing the player character to act, for example, walking, holding a sword, turning back, picking up some items.

The game system 100 including the game program and the game console 1 executes processes corresponding to the operation input by the user so that the game is advanced.

(GAME CONTENTS) Next, it will be described that the game executed by the game program in one embodiment of the present invention.

Figure 2:
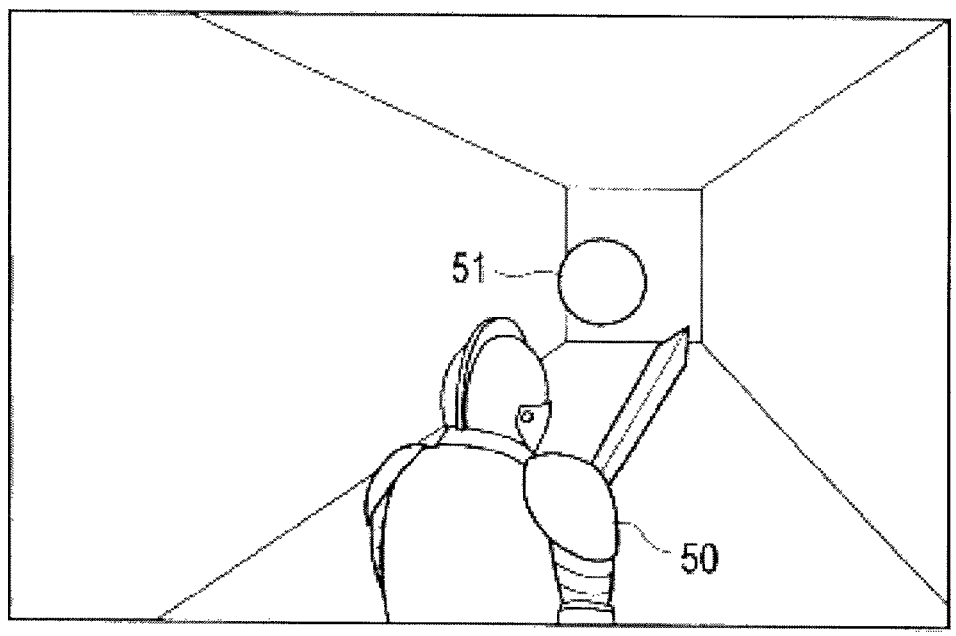
FIG. 2 is a view of an exemplary game screen of the dungeon in which a player character exploring in the dungeon.

The game is that the player character operated by the user explores in a dungeon or a building (Hereinafter, collectively referred to as a dungeon), which is the three dimensional virtual game space. A player character 50 and an item 51 set in the dungeon are displayed on the game screen in FIG. 2. The game character 50 picks up the item 51 while exploring in the dungeon and heads for the goal. Also the monster characters attacking the player character are set in the dungeon (not illustrated in the drawings). The monster characters interrupt the player character exploring in the dungeon.

The dungeon is automatically generated every time the player character gets into the dungeon. The dungeon is expanded not only in two dimensional (plane) directions but also in three dimensional directions.

(GAME DEVICE) Next, it will be described that the game device configured with the game console 1 executing the game program.

Figure 3:
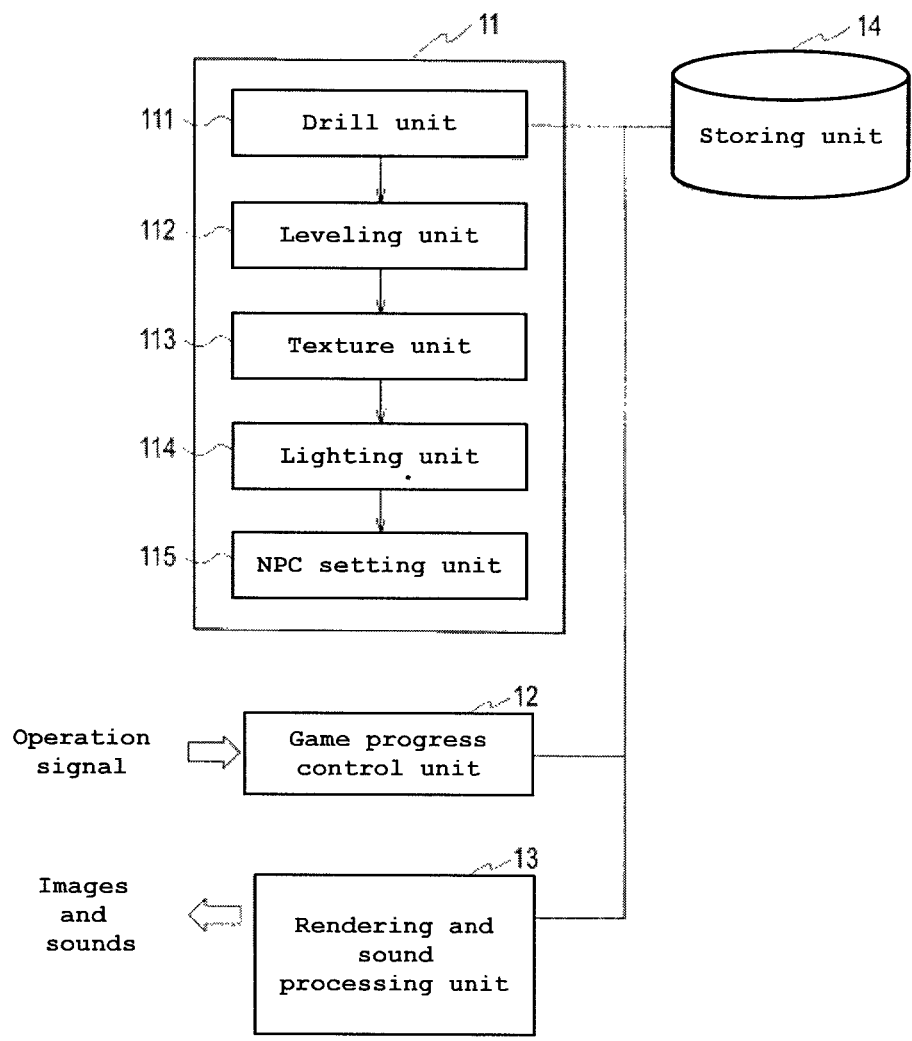
FIG. 3 is a block diagram of a configuration of the game device executing a game program according to one embodiment of the present invention.

The game device illustrated in FIG. 3 includes a dungeon generating unit 11 (an activity space generating unit), a game progress control unit 12, rendering and sound processing unit 13, and a storing unit 14.

The dungeon generating unit 11 includes a drill unit 111 (a setting unit), a leveling unit 112, a texture unit 113, a lighting unit 114, and a Non Player Character (NPC) setting unit 115 and generates the three dimensional virtual game space where the player character can act.

The drill unit 111 generates the activity space where the player character can move in the three dimensional space. The activity space is, for example, a maze-like dungeon made by expanding underground, a building with rooms and corridors, and a town with roads and a plaza surrounded by buildings and walls.

The leveling unit 112 levels the level differences to make the player character can go through in the activity space. As one embodiment, the leveling unit 112 sets the slopes instead of the level differences or sets a ladder object on the level differences.

The texture unit 113 renders texture on the activity space.

The lighting unit 114 sets a light source in the activity space.

The NPC setting unit 115 sets objects such as non-player characters, for example, monster characters and items.

The game progress control unit 12 controls the player character corresponding to the operation input by the user on the controller 120, controls the NPC with predetermined processes, and advances the game.

The rendering and sound processing unit 13 renders images of the games pace, the player character, and the NPC and outputs the images on the monitor 138. Also the rendering and sound processing unit 13 outputs sound effects, Back Ground Music (BGM), and voice corresponding to the game progress.

The storing unit 14 stores the data necessary for advancing the game such as modeling data of objects set in the game space, texture data, sound effect data, and BGM data.

(DUNGEON GENERATION) Next, the generating process of the drill unit 111 generates the activity space. It will be described one embodiment that the drill unit 111 generates the dungeon by expanding the activity space underground in the game space.

Figure 4:
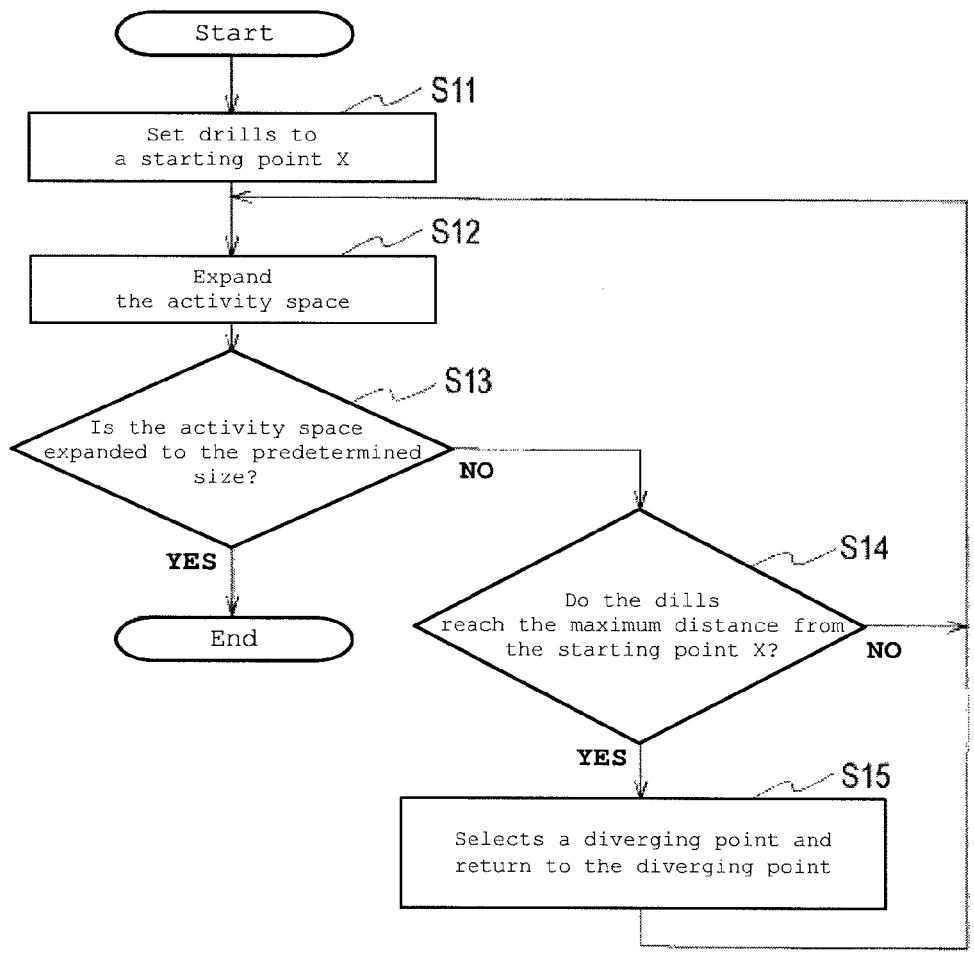
FIG. 4 is a flowchart of a process of generation of the dungeon by a drill unit.
Figure 5:
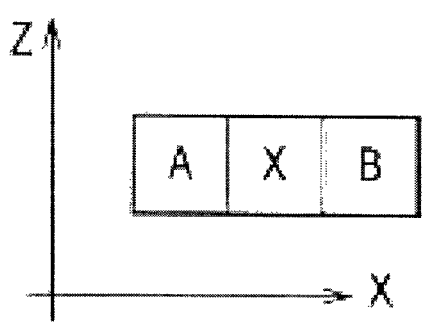
FIG. 5 is a plane view of a first position of the drill in the dungeon.
Figure 6A:
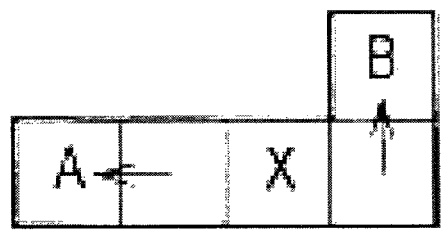
FIGS. 6A and 6B are plane views of the dungeon expanded an activity space in which the player characters acts.
Figure 6B:
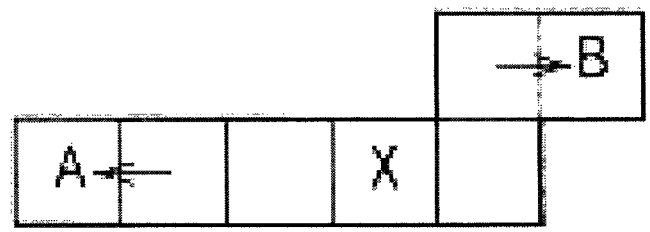
Figure 7:
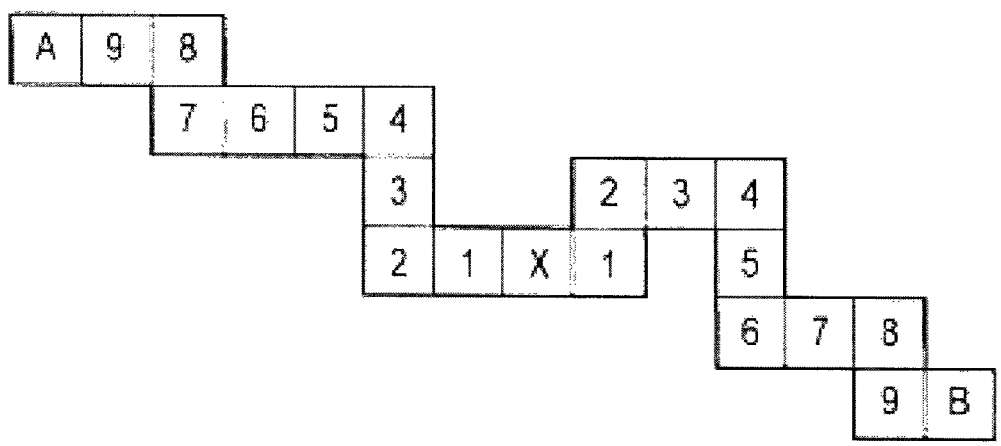
FIG. 7 is a plane view of the dungeon indicating distance from the first position of the drill to the present position of the drill

FIG. 4 is a flow chart of a process of a drill unit 111 generating the activity space. FIG. 5 to FIG. 8 is a plane view illustrating expansion of the activity space by the drill unit 111. In actual, the drill unit expands the activity space not only in the XZ plane but also in height direction (Y direction). However, here, one embodiment expanding in the XZ plane will be described to understand easily. One embodiment expanding in the Y direction will be described later.

First, the drill unit 111 sets the virtual drill A and the virtual drill B (Hereinafter, The drills A and B) adjacent to the starting point X and sets each parameters to the drills A and B individually (Step S11). As example of FIG. 5, the drill unit 111 sets the drill A in the −X direction (on the left side of the starting point X) and the drill B in the +X direction (on the right side of the starting point X). The drill unit 111 sets the parameters shown in Table 1 to the drills A and B.

TABLE 1

| expanding direction | A | B |
|---|---|---|
| +X direction | 0 | 30 |
| −X direction | 30 | 0 |
| +Y direction | 5 | 5 |
| −Y direction | 5 | 5 |
| +Z direction | 10 | 10 |
| −Z direction | 10 | 10 |

The table 1 is one embodiment of a parameter indicating percentage of the direction in which each of the drill A and B expands the dungeon. When the numerical value (percentage) of the parameter is larger, the percentage of expanding in each of the directions of the drills A and B will be higher. The activity space is expanded in the directions the drills A and B move. According to the parameter indicated on the table 1, the +X direction of the drill A set 0 so that the drill A never drills in +X direction. On the other hand, the parameter of the −X direction of the drill B is set 0, the drill B never drills in −X direction. Therefore, the drill A moves in the left direction from the starting point X and the drill B moves in the right direction from the starting point X. Parameter of Z direction set for each of the drills A and B are smaller than parameter of x direction so that the activity space can be expanded longer horizontally.

The drills A and B expand the activity space in different direction at random based on the parameter set for each (Step S12). The drill A moves in −X direction and the drill B moves in +Z direction in FIG. 6A. Continuously, the drill A moves in −X direction and the drill B moves in +X direction in FIG. 6B. The drills A and B expand the dungeon by a predetermined 3D map unit (Hereinafter, map unit) in X and Z direction. In one embodiment, height of the player character is set 1.75 meter and XZ plane of the map unit is set 5 meter by 5 meter. The height of the player character and square measure of the 3D map unit is on embodiment; however, the present invention is not so limited. As one embodiment, the dungeon expanded by each of the drills A and B may not be connected each other except for the starting point X. The dungeon expanded by each of the drills A and B may be connected each other anywhere depending on the configuration of the dungeon.

The drill unit 111 determines whether the dungeon expanded to the predetermined size every when the dungeon is expanded with a map unit by the drills A and B (Step S13). The size of the dungeon is predetermined as initial setting (e.g. 300 map units). When total number of map units is greater than or equal to the predetermined number, the drill unit 111 determines that the dungeon becomes predetermined size. When the dungeon becomes predetermined size (Step S13: YES), the drill unit 111 ends the expanding process.

The drill unit 111 determines whether the distance from the starting point X to the drills A and B reach the maximum distance in every when the dungeon is expanded with a map unit by the drills A and B (Step S14). The distance from the starting point X to the drills A and B is the number of map units counted from the starting point X as $0^{th}$ map unit to each of the drills A and B. According to one embodiment in FIG. 7, both of the drills A and B are 10 map units away from the starting point X.

When the distance from the starting point X to the drills A and B do not reach the maximum distance (Step S14: NO), the drills A and B keep expanding the dungeon (return to the Step S12).

When the distance from the starting point X to the drills A and B reach the maximum distance (Step S14: YES), the drills A and B return to the predetermined diverging point along the map units with which the dungeon is expanded. If the maximum distance is 10 map units, both of the drills A and B have already reached the maximum distance from the starting point X in FIG. 7. So, the drills A and B return to the predetermined diverging point along the map units. According to one embodiment in FIG. 8, the drill A returns to the $7^{th}$ map unit from the starting point X, and the drill B returns to the $6^{th}$ map unit from the starting point X. The diverging point may be predetermined with the map unit number, the first corner, or the continuous straight line.

Figure 8:
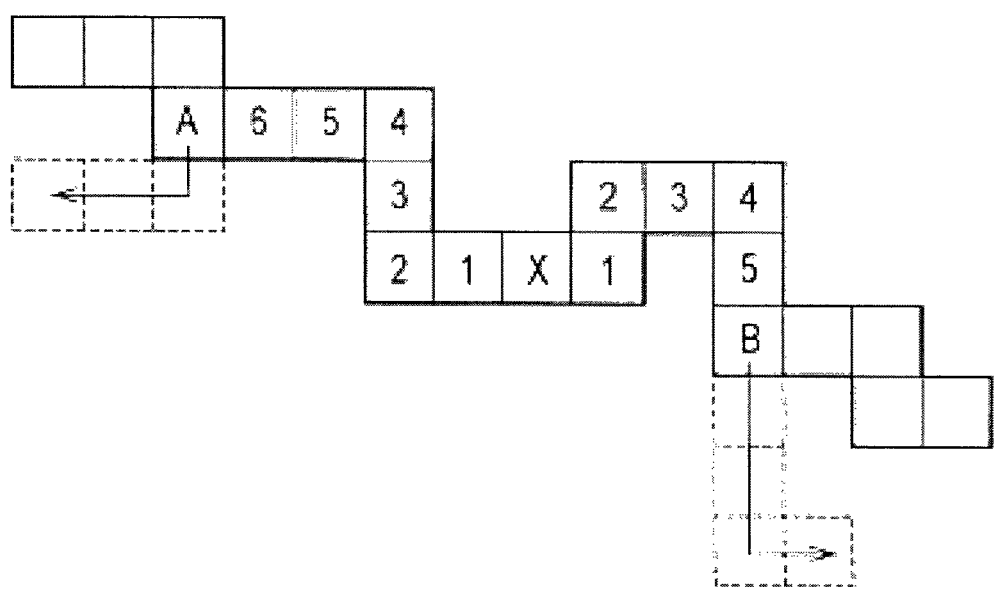
FIG. 8 is a plane view of the dungeon where the drills have returned to the diverging point.

After turning back to the diverging point, the drill A and B starts newly expanding from the diverging point (Step S12). As illustrated in FIG. 8, the drills A and B newly expand individually to the direction of the arrows. After that, the drill unit 111 generates the dungeon with the predetermined size by repeating the processes of steps S12, S13, S14, and S15.

Figure 9:
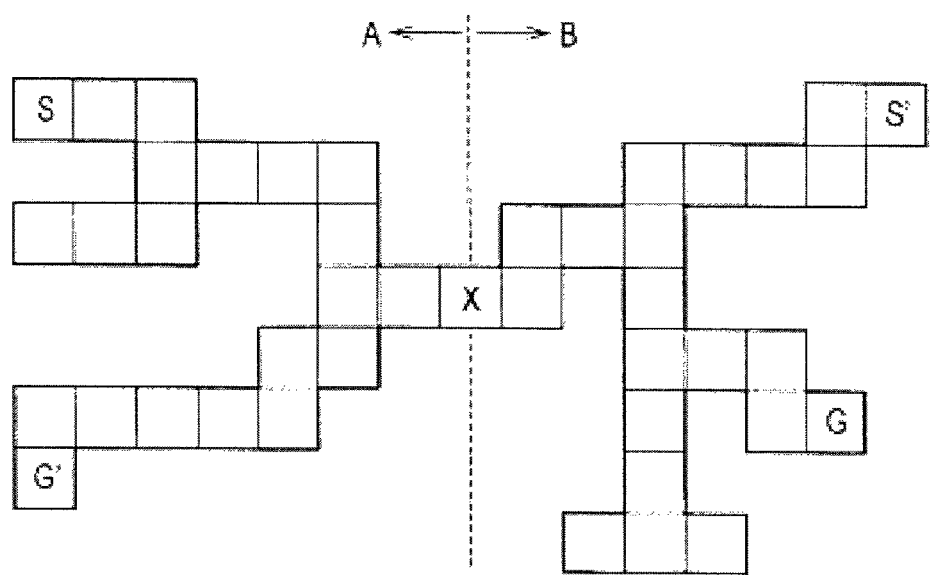
FIG. 9 is a plane view of one embodiment of a generated dungeon.

FIG. 9 is a plane view of one embodiment generated dungeon. After finishing expansion of the dungeon, the drill unit 111 selects starts and goals from the map units in each of dungeons expanded by the drills A and B. When the drill unit 111 selects the start S from the map units in the dungeon expanded by the drill A, the goal G is selected from the map units in the area expanded by the drill B. In other hand, when the drill unit 111 selects the start S' from the map units in the area expanded by the drill B, the goal G' is selected from the map units in the areas expanded by the drill A. Each of the map units, the start S and the goal G are selected from the map units that are equal to or more than predetermined distance (e.g. 7 map units) away from the starting point X. Therefore, the path from the start S to the goal G passes through the starting point X, and the distance between the start S and the goal G is equal to or more than the predetermined distance. The player characters inevitably get contact with such as an important NPC and items by setting the important NPC and items at the starting point X. A plurality of users plays the game in the same dungeon, the start S and the goal G are set to one use, the start S' and the goal G' are set to the other user. That makes the plurality of users passes through each other at the starting point X. The start S and the goal G may be selected from the map units being dead end. A plurality of starts can be set to one goal, and vice versa.

The present dungeon generation method can generate the dungeon reflected the intention of the developers by changing the starting point X and the parameter. For example, the drill A expands the dungeon to upper left direction and the drill B expands the dungeon to lower right direction by setting the parameter of the drill A in −Y direction (downward) to 0, and the parameter of the drill B in +Y direction (upward) to 0. That generates a latitudinal dungeon deepening left to right. As one embodiment, the drills A and B are individually set on the −Y (deep) side and +Y (shallow) side, and correspondingly the parameters of −Y direction and +Y direction are set larger. That generates a longitudinal dungeon. Size of the dungeon generated by the drill A and B may be different. For example, the dungeon generated by the drill A is twice as big as the dungeon generated by the drill B. Moreover, each maximum distance from the starting point to the drills A and B can be different.

As described above, two of drills A and B separately expand the dungeon at the same time. However, it is not necessary to expand to two directions at the same time. Instead, the dungeon may be expanded in one direction at a time from the starting point X to individual directions. As one embodiment, after the dungeon is expanded on the right side of the starting point X to the half of the predetermined size, the dungeon is expanded on the left side of the starting point X to the lest of the half of the predetermined size. The number of directions to be expanded from the starting point X is not limited to only two, but also three or more may be applicable.

(A ROOM INSIDE THE DUNGEON) Next, it is described that the room is expanded in the dungeon.

Figure 10:
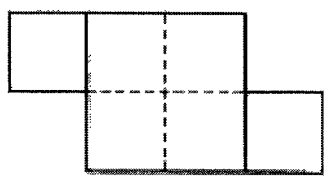
FIG. 10 is a plane view of an exemplary room generated in the dungeon.

The drill unit 111 generates the room which is the area larger than the corridors in the dungeon. As illustrated in the FIG. 10, 2×2 map units size of room is generated in the middle of the corridors. In one embodiment, the room is a large corridor. For example, the expanding process in the step S12 in the FIG. 4, the drill unit 111 determines the size of the room. The drill unit 111 determines whether the dungeon is satisfying a predetermined condition when generating the room instead of the corridor. When satisfying the predetermined condition, the room (a large corridor) is generated. The predetermined condition includes the size of the dungeon and a percentage (e.g. 30 percent) of the room to whole size of the dungeon. The drill unit 111 determines the size of the room to equal to or more than the predetermined minimum size (e.g. 2×2 map units).

Here, it is described that generating the room with specific value as an example. In one embodiment, the size of room is set 30 percent to the dungeon and 2×2 map units. When 7 map units long corridor has been generated, if 2×2 map units room is generated, the size of the dungeon is 11 map units (7+2×2=11). At this time, the percentage of the room to the dungeon is 36 percent (2×2÷11=0.36). As the result, because the percentage of the room is over the predetermined percentage (30 percent), the drill unit 111 determines to expand the corridors not to generate the room. When 8 map units long corridor has been generated, the size of the dungeon is 12 map units (8+2×2=12), then the percentage of the room to the dungeon is 30 percent (2×2÷12=0.3). Because the percentage of the room is equal to or less than the predetermined percentage 30 percent, the drill unit 111 generates the 2×2 map units room.

(LOOP CORRIDOR) Next, generation of the loop corridor will be described.

In one embodiment, the drill unit 111 generates the loop corridor according to the setting. The drill unit 111 selects any map unit as a starting point C of the loop corridor after generating the dungeon in the predetermined size. The drill unit 111 generates the loop corridor, if the map units are connected when expanding predetermined map units from the starting point C of the loop corridor.

Figure 11A:
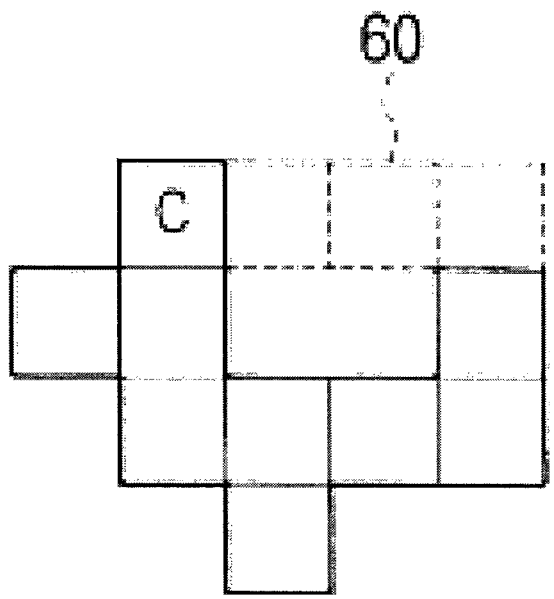
FIG. 11A is a plane view of the dungeon before generating an exemplary loop corridor.
Figure 11B:
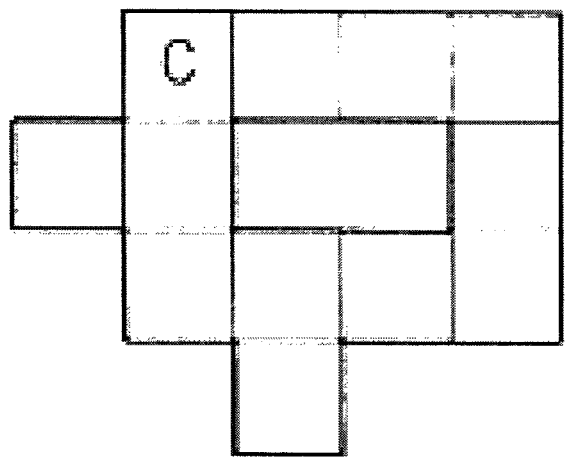
FIG. 11B is a plane view of the dungeon after generating the loop corridor.

FIG. 11A is a plane view before generating the loop corridor and FIG. 11B is a plane view after generating the loop corridor. In FIG. 11B, the drill unit 111 selects the map unit C as the starting point C of the loop corridor and generates the loop corridor from the map unit C to the right by expanding the dungeon for 3 map units.

Figure 12:
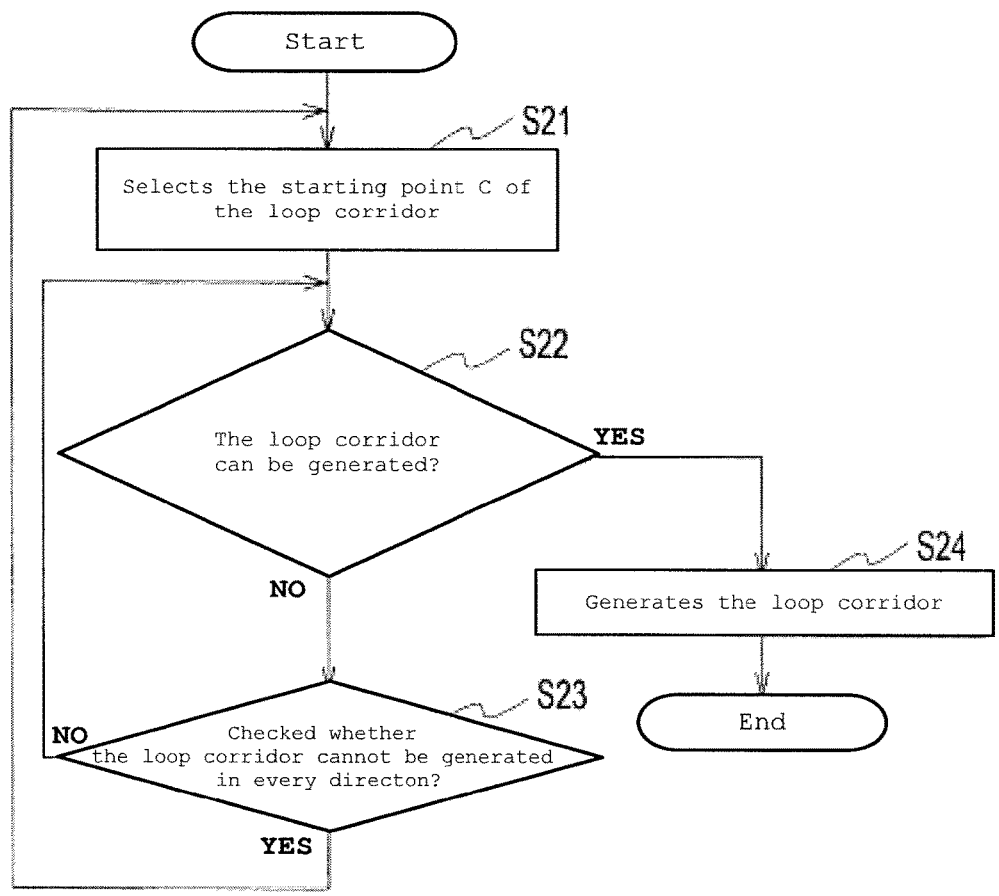
FIG. 12 is a flowchart of a generation process of the loop corridor.

Next, the flow of a generation process of the loop corridor will be described. FIG. 12 is a flow chart of a generation process of the loop corridor.

First, the drill unit 111 selects the map unit as the starting point C of the loop corridor (Step S21). In one embodiment, the drill unit 111 selects a map unit being a dead end as the starting point C. The drill unit 111 may select the map unit being the corner or in the middle of the straight line as the starting point C.

The drill unit 111 determines whether the loop corridor can be generated when expanding predetermined number of map units in the direction in which has not been expanded from the starting point C (Step S22). The number of map units is set as initial value. The drill unit 111 selects other direction if the loop corridor is not generated in the direction selected in the step S22. If the loop corridor cannot be generated in every direction (Step S23: YES), the drill unit 111 selects different map unit as the starting point C (turning back to the step S21).

Figure 13:
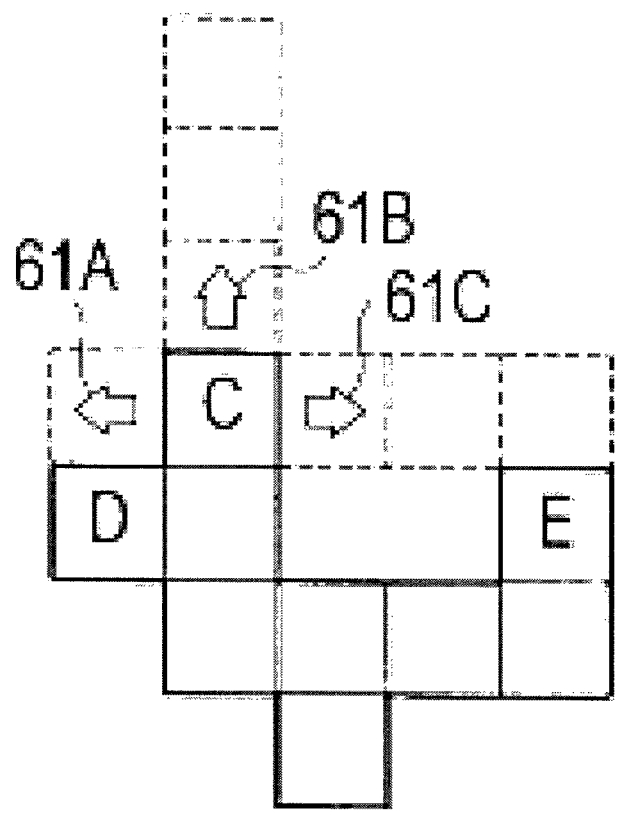
FIG. 13 is a plane view of the dungeon when determining whether the loop corridor can be generated.

As one embodiment in the plane view in FIG. 13, the drill unit 111 determines whether the loop corridor is able to be made in each of the three directions 61A, 61B, and 61C sequentially when the drill unit 111 selects the map unit C as the starting point C. In the direction of 61A, the first map unit is connected to the map unit D so that the drill unit 111 determines that the loop corridor is not able to be made. In the direction of 61B, after expanding for the predetermined map unit (3 map units); the third map unit is not connected to any map unit so that the drill unit 111 determines that the loop corridor is not able to be made. In the direction of 61C, the third map unit is connected to the map unit E so that the drill unit 111 determines that the loop corridor is able to be made.

When the loop corridor is able to be made from the selected map unit (Step S22: YES), the drill unit 111 expand the activity space to the direction and generates the loop corridor (Step S24).

By the process as described above, the loop corridor is generated. The loop corridor is able to be made at a plurality of points by repeating the above process. The number of loop corridor to be made is predetermined. The predetermined number of map units with which the drill unit 111 determines whether the loop corridor is able to be made is not limited to three.

(EXPANDING IN THE HEIGHT DIRECTION) Next, it will be described that the drill unit 111 expands in the height direction (Y direction).

Figure 14:
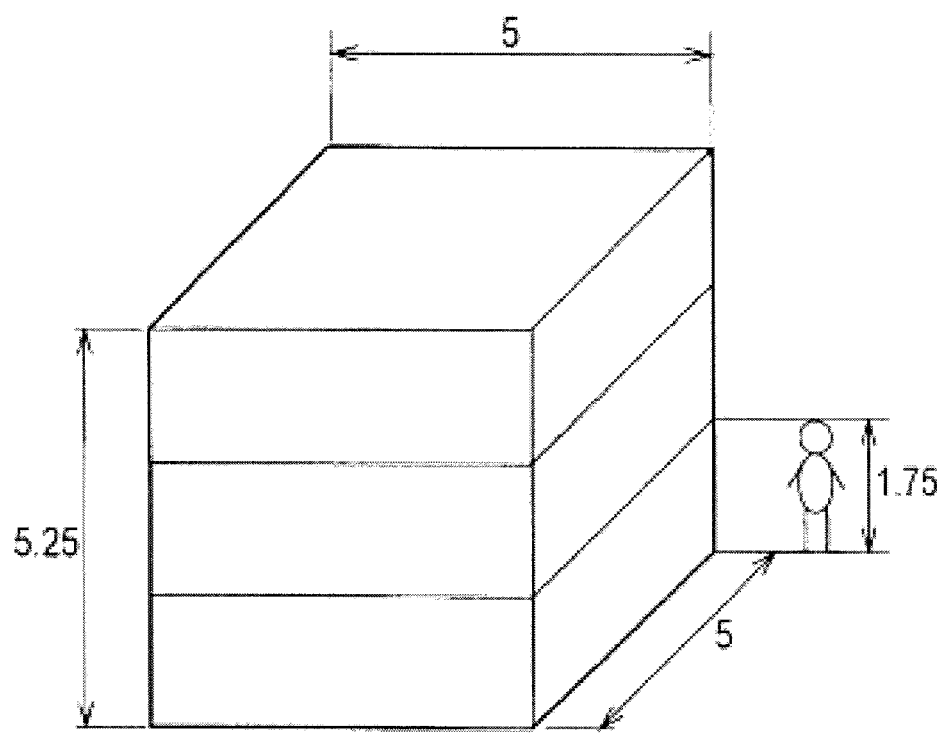
FIG. 14 is a perspective view of a rectangular cuboid as a three dimensional (3D) map unit that is a tile (unit) for expanding the dungeon.

As above, one embodiment that the drill unit 111 expands the activity space with one map unit in the XZ plain is described to understand easily. When the player character can move and act in the 3D virtual space (height direction), the drill unit 111 expands the activity space on a map unit basis. The map unit is the rectangular cuboid described in FIG. 14 (width (X direction)×depth (Z direction)×height (Y direction)=5 m×5 m×5.25 m). When the drills A and B expand 1 map unit on the XZ plane, the activity space in the dungeon is expanded with the map unit being the rectangular cuboid in FIG. 14.

Figure 15:
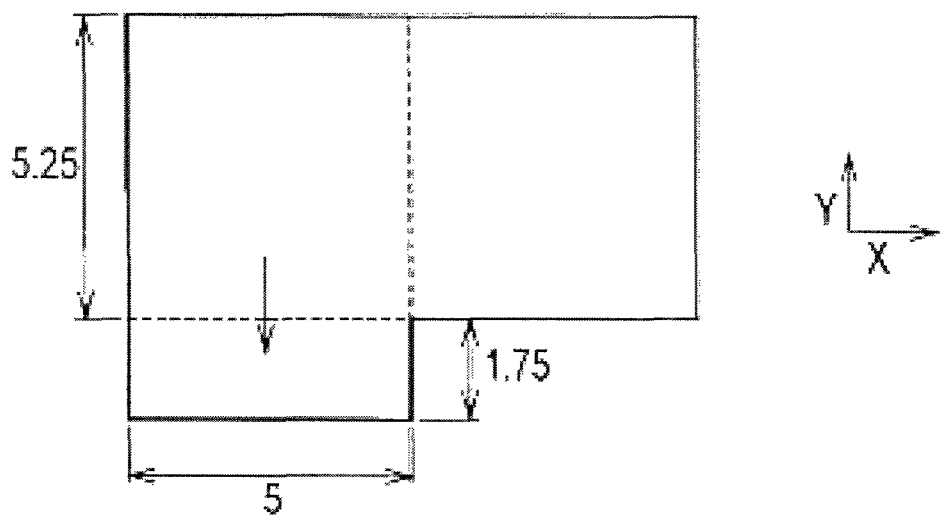
FIG. 15 is a longitudinal sectional view in the view from the Z axial direction when the dungeon is expanded in a height direction.

When expanding in the height direction (Y direction), the drill unit 111 expands shorter distance (1.75 m) than the distance (5 m) expanded 1 map unit in the X and Z direction. In other words, when the drills A and B expand in Y direction, the activity space is expanded for one third of the rectangular cuboid in Y direction. As indicated in FIG. 15, the drills A and B expand with one third of the rectangular cuboid in the height direction. The quantity of expanding in the height direction is not limited to one third of the rectangular cuboid.

Figure 16:
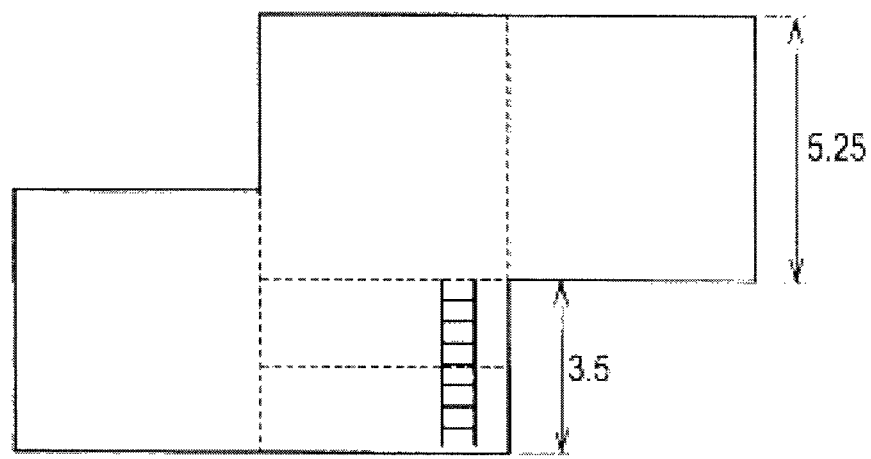
FIG. 16 is a longitudinal sectional view of the dungeon set ladder.
Figure 17:
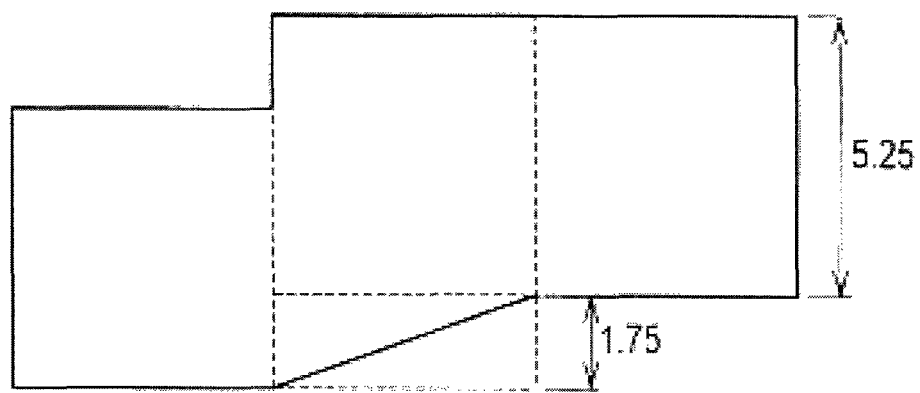
FIG. 17 is a longitudinal sectional view of generation of a slope on a level difference.

The leveling unit 112 executes the process setting a ladder (FIG. 16) or setting a slope (FIG. 17) onto the level differences made by expanding in the height direction. As one embodiment, the ladder is set on level difference equal to or more than twice height (1.75 m×2), and the slope is set on one level difference (1.75 m). The staircase may be set instead of the slope. Raising and lowering object such as rope or an elevator can be set on equal to or more than twice deep level differences (3.5 m).

Figure 18A:
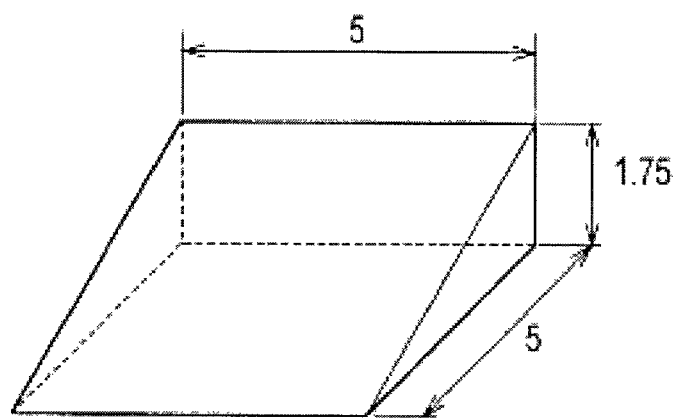
FIGS. 18A and 18B are longitudinal sectional views of various forms of slope parts to generate slope on level differences.
Figure 18B:
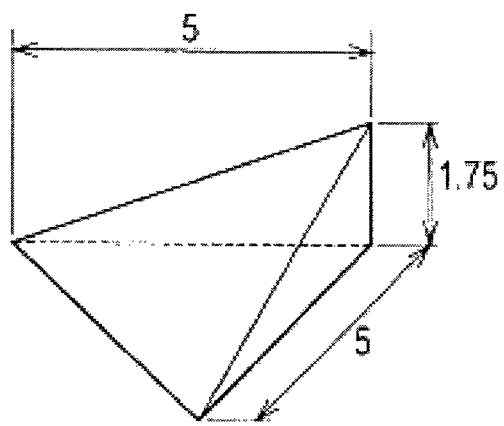

When the slope is set on the level difference, the leveling unit 112 sets the slope parts described in FIG. 18A and FIG. 18B on the level difference. The slope parts described in FIG. 18A fills the one level difference. The slope parts described in FIG. 18B can be set adjacent to the both sides (triangle sides) of the slope parts described in FIG. 18A.

Figure 19A:
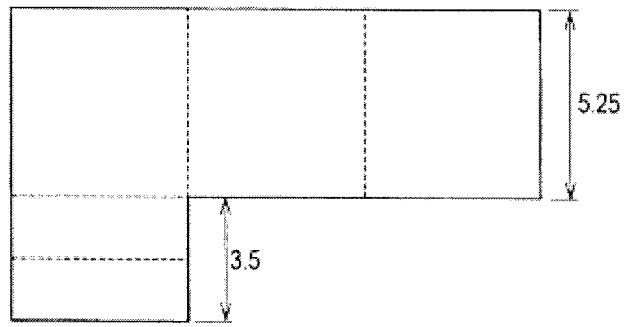
FIG. 19A is a longitudinal sectional view of the dungeon with a twice deep level difference.
Figure 19B:
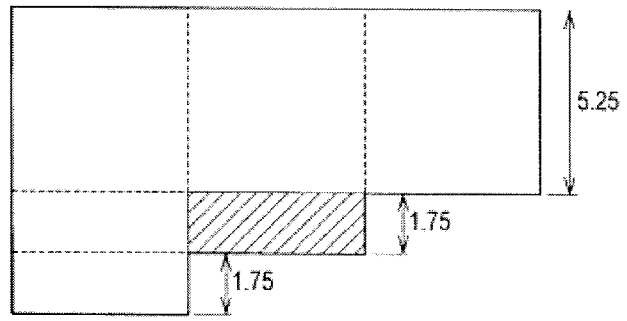
FIG. 19B is a longitudinal sectional view of the dungeon where a level difference (hatched area) is generated in front of the twice deep level difference.
Figure 19C:
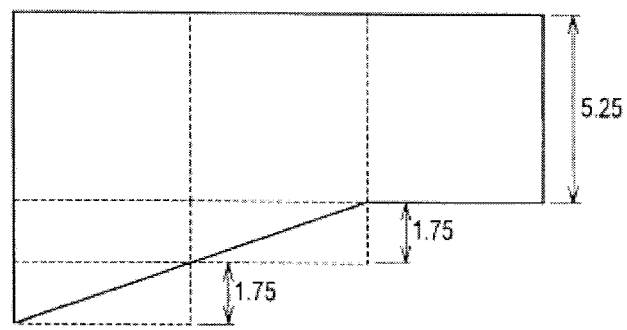
FIG. 19C is a longitudinal sectional view of the dungeon where a slope is formed on the level differences.

Even if the level difference is equal to or more than twice deep, when the corridor is equal to or more than 2 map units long straight from the level difference, the leveling unit 112 set the slope on the level difference. For example, when the level difference is twice deep and the corridor is 2 map units long straight from the upper level difference (FIG. 19A), the leveling unit 112 generates the slope at the hatched area as a level difference (FIG. 19B), then the slope parts are set on each of the level differences (FIG. 19C). Instead, when the corridor is equal to or more than 2 map unit long straight from the lower level difference, and the level difference is equal to or more than twice deep, the leveling unit 112 may set the slope parts after generating 2 level differences of one level difference height.

Number of ladders in the dungeon can be reduced by generating slope so that the player character can move smoothly. The leveling unit 112 generates the staircase instead of the slope.

(CHARACTERISTIC CORRIDOR) Next, it is described that the process characterizing corridors.

By generating such space as dead end or T junction that not effects the act of the player character, the corridor in the dungeon can be characterized so that the users can easily memorize the geographic of the dungeon.

Figure 20A:
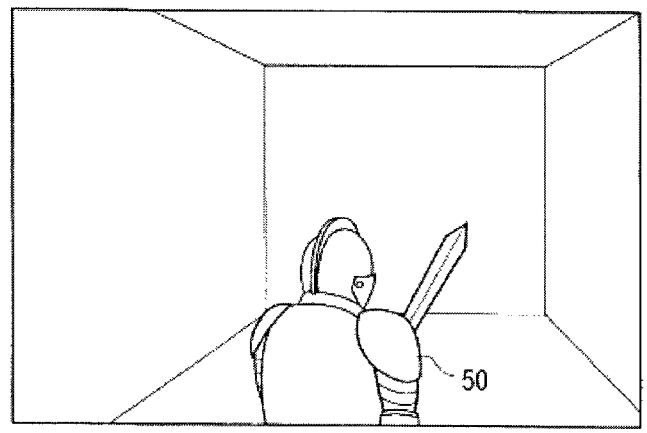
FIG. 20A is a view of an exemplary game screen of a dead end in the dungeon.
Figure 20B:
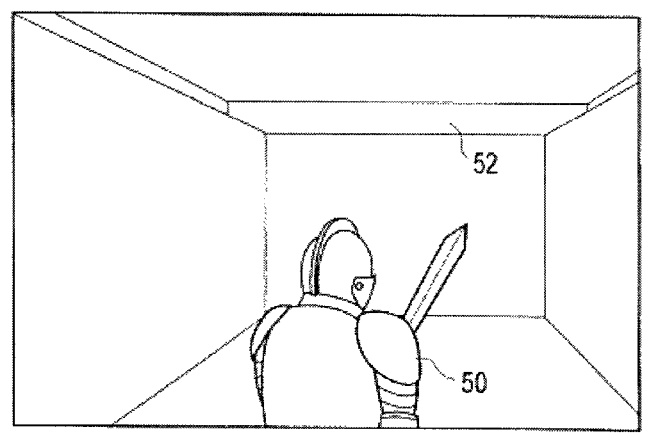
FIG. 20B is a view of an exemplary game screen of the dead end with space over the corridor in the dungeon.

FIG. 20A is one embodiment of the game screen when the player character is at dead end in the dungeon. FIG. 20B is one embodiment of the game screen when the player character is at dead end with space over the corridor in the dungeon. Because the drill unit 111 expands the activity space with the map unit being the rectangular cuboid, every dead end is the same space as illustrated in FIG. 20A. As illustrated in FIG. 20B, the leveling unit 112 generates the space 52 that is a space above a dead end so that dead ends have individually different form. As bellow, it will be described one embodiment generating a space over (or above) the corridor and one embodiment generating cliff beside the corridor.

First, it will be described that one embodiment generating the space over the corridor.

Figure 21A:
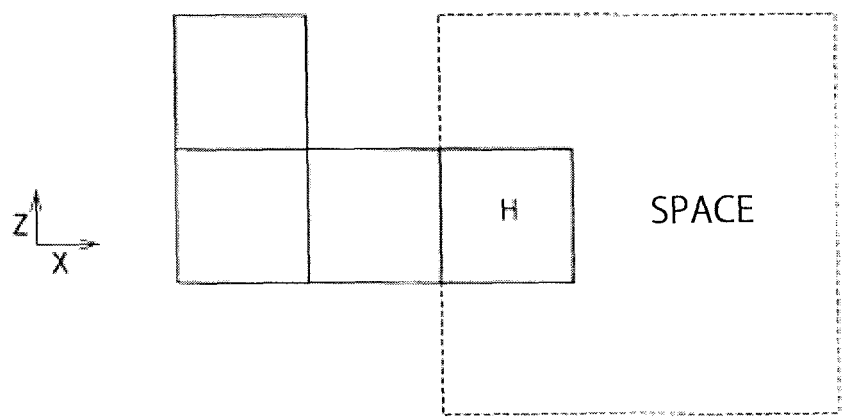
FIG. 21A is a plane view of an exemplary dead end with space over the corridor.
Figure 21B:
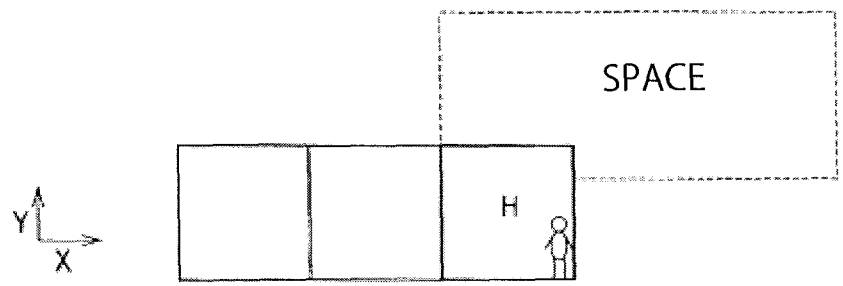
FIG. 21B is a longitudinal sectional view of the exemplary dead end with space over the corridor.

FIG. 21A is a plane view of an exemplary dead end with space over the corridor. FIG. 21B is a longitudinal sectional view of the exemplary dead end with space over the corridor. In one embodiment, the size of the space above the dead end is 3×3 map units (9 rectangular cuboids). The space above the dead end is set on one third of upper side of the map unit H with one of the 3×3 map units overlapping with the map unit H. In other word, the space above the dead end is generated in the 3×3 map units size on the two third of the height from the bottom side of the map unit H and at random position in the 5×5 map units centering the map unit H. Because the height of the player character is one third of the rectangular cuboid, the player character cannot enter the space above the dead end generated on two third heights.

By generating the space above the dead end at random position, each dead end has individually different form. The object such as light can be set in the activity space. The space over the corridor may be generated not only at dead end but also at T junction or at the corner of the room. The size of the space above the dead end is not limited to 3×3 map units. The height to generate the space over the corridor can be any height as it cannot be entered by the player character.

Next, it will be described one embodiment generating a cliff by the corridor.

Figure 22A:
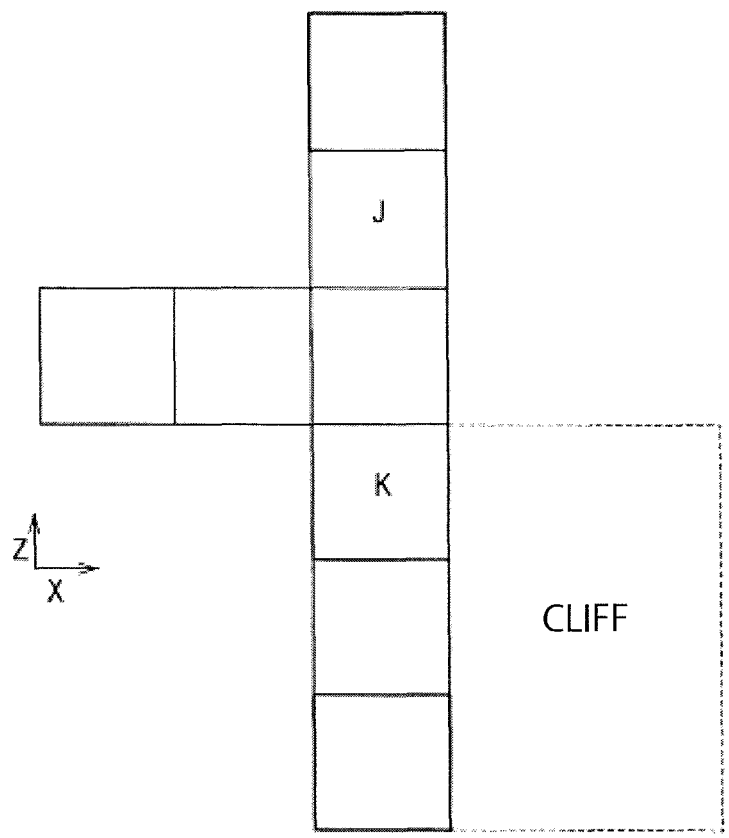
FIG. 22A is a plane view of an exemplary T junction with a cliff.
Figure 22B:
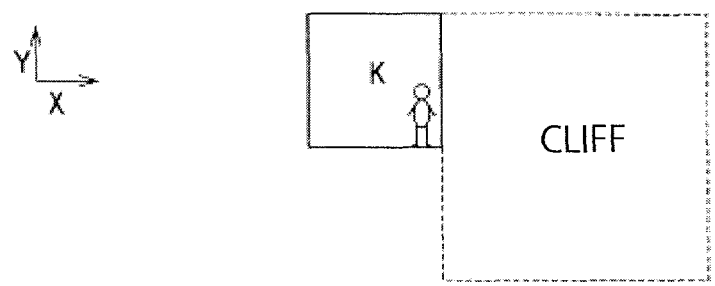
FIG. 22B is a longitudinal sectional view of the exemplary T junction with the cliff.

FIG. 22A is a XZ plane view illustrating a T junction with a cliff. FIG. 22B is a XY cross section illustrating a T junction with a cliff. In one embodiment illustrated in FIGS. 22A and 22B, a cliff is generated by the map unit K (adjacent to the map unit K) one of the two ends of T junction; the map units J and K. The cliff can be a landmark so that the user can easily memorize the geographic of the dungeon.

In one embodiment, the cliff is 1 map unit deep; however the depth of the cliff is not limited to 1 map unit deep. Same as a wall unit that is the map unit neither the corridor nor the room, the cliff map unit is set not to be entered by the player character so that the player character does not fall over the cliff.

It will be described that the method to determine where to generate the cliff. First, the leveling unit 112 selects a reference map unit from two ends of T junction; the map units J and K. Next, the leveling unit 112 determines 3×3 map units including the reference map unit in the XZ plane at random. After that, the leveling unit 112 forms the cliff on a wall map unit: not the corridor or rooms or level differences, on the 3×3 map units. In one embodiment in FIG. 22A and FIG. 22B, the leveling unit 112 selects the map unit K as the reference map unit. After that, the leveling unit 112 selects the 3×3 map units including the map unit K on upper left side at random, and generates the cliff at the 6 wall map unit (on the right side of the map unit K) in the 3×3 map units.

The number of map units forming the space over the corridor or the cliff is set accordingly to the predetermined parameter.

(PROCESS AFTER GENERATING DUNGEON) After the dungeon is generated by the drill unit 111 and the leveling unit 112, the texture unit 113 and the lighting unit 114 determines interior of the dungeon. The NPC setting unit 115 sets NPC and items necessary for advancing the game in the dungeon.

The texture unit 113 sets texture such as rock pattern layering on rough surface model on the wall and the ceiling if it is necessary. When the dungeon is a building, the texture unit 113 sets wallpapers and sets 3D model such as arch suits for building on the ceiling and layers ceiling texture on the 3D model. The texture unit 113 may set objects such as a pillar and a fountain in the large space such as a room.

The lighting unit 114 randomly selects the map unit from the map units having floor, ceiling, or pillar and sets a light source on the selected map unit.

The NPC setting unit 115 sets monster characters on the map unit randomly selecting from the map units that is a corner of the corridor or dead end. The NPC setting unit 115 sets objects reflecting intention of the developers. For example, the NPC setting unit 115 sets the object necessary to advance the game on the starting point X. Otherwise, the NPC setting unit 115 sets such as rare item or rare accessory on the start S far from the goal G.

As described above, it is possible to generate the path from the start S to the goal G necessary to pass through the starting point X by expanding the dungeon based on the parameter in two directions from the starting point X and selecting the start S and the goal G from each area expanded in each direction. The developer can determine the size of the whole dungeon by determining the direction to expand the dungeon with the parameter.

According to the embodiment described above, the drill unit 111 can intentionally generate the loop corridor, by selecting the starting point of the loop corridor and generating the loop corridor from the starting point of the loop corridor when the loop collider can be generated by expanding in any direction for a predetermined number of map units from the starting point of the loop corridor.

According to the embodiment described above, the leveling unit 112 set the slope on the level difference as the height of the player character so that the number of ladders in the dungeon can be reduced and the player character can move smoothly in the dungeon.

According to the embodiment described above, the user can easily memorize the geography by generating the spaces upper dead end and T junction and by generating the cliffs, because the spaces and cliffs can be landmarks.

INDUSTRIAL APPLICABILITY

As described above, the present invention can provide the game device automatically generating the game space reflected the intention of the developer.

The invention claimed is:

1. A game device generating an activity space that is a virtual game space where game characters act, the game device comprising:
   a monitor displaying a game screen;
   a controller input operation by a user;
   a memory on which data is stored;
   a storing unit storing a parameter indicating a percentage in each direction to generate the activity space on the memory;
   an activity space generating unit generating the activity space in at least two different directions from a starting point in a virtual game space at random based on the parameter;
   a setting unit setting at least one start and at least one goal in each activity space generated in different directions;
   a controlling unit moving game characters in the activity space in response to an operation signal input from the controller; and
   a rendering unit rendering the game screen including the activity space and the game characters and displaying the game screen on the monitor,
   wherein the activity space generating unit generates the activity space both in a planar direction and in a height direction, and
   wherein the activity space generating unit comprises a leveling unit forming a slope object shaped like a slope or a staircase on a level difference when the height of the level difference is equal to or lower than a predetermined height, and the leveling unit setting an elevator object for elevating and lowering when the height of the level difference is higher than the predetermined height.

2. The game device according to claim 1,
   wherein the activity space generating unit selects a diverging point and expands the activity space from the diverging point when the activity space generating unit has generated the activity space to a maximum point,
   wherein the diverging point is selected from any point in the activity space from the starting point to the maximum point before the activity space is expanded, and
   wherein the maximum point is at predetermined maximum distance from the starting point.

3. The game device according to claim 1,
   wherein the activity space generating unit generates the activity space on a map unit basis, the map unit having predetermined size, and
   wherein the activity space generating unit selects a first point in the activity space and generates the activity space from the first point to a second point when the first point is connected to the second point in the activity space by generating the activity space with the predetermined number of map units from the first point to the second point.

4. The game device according to claim 3,
   wherein the predetermined number of map units is three or more.

5. A method for controlling a game device comprising a monitor displaying a game screen, a controller on which the user inputs operation, and a memory on which data is stored, the method comprising:
   a storing step storing a parameter indicating a percentage in each direction to generate an activity space that is a virtual game space where game characters act on the memory;
   an activity space generating step generating the activity space in at least two different directions from a starting point in the virtual game space at random based on the parameter;
   a setting step setting at least one start and at least one goal in each activity space generated in different directions;
   a controlling step moving the game characters in the activity space in response to an operation signal input from the controller; and
   a rendering step rendering the game screen including the activity space and the game characters and displaying the game screen on the monitor,
   wherein the activity space generating step generates the activity space both in a planar direction and in a height direction, and
   wherein the activity space generating step comprises a leveling step forming a slope object shaped like a slope or a staircase on a level difference when the height of the level difference is equal to or lower than a predetermined height, and the leveling unit setting an elevator object for elevating and lowering when the height of the level difference is higher than the predetermined height.

6. The method according to claim 5,
   wherein the activity space generating step selects a diverging point and expands the activity space from the diverging point when the activity space generating unit has generated the activity space to a maximum point,
   wherein the diverging point is selected from any point in the activity space from the starting point to the maximum point before the activity space is expanded, and
   wherein the maximum point is at predetermined maximum distance from the starting point.

7. The method according to claim 5,
   wherein the activity space generating step generates the activity space on a map unit basis, the map unit having predetermined size, and
   wherein the activity space generating step selects a first point in the activity space and generates the activity space from the first point to a second point when the first point is connected to the second point in the activity space by generating the activity space with the predetermined number of map units.

8. The method according to claim 7,
wherein the predetermined number of map units is three or more.

9. A non-transitory computer-readable storage medium storing a program for causing a computer comprising a monitor displaying a game screen, a controller on which the user inputs operation, and a memory on which data is stored to execute;
a storing process storing a parameter indicating a percentage in each direction to generate an activity space that is a virtual game space where game characters act on the memory;
an activity space generating process generating the activity space in at least two different directions from a starting point in the virtual game space at random based on the parameter;
a setting process setting at least one start and at least one goal in each activity space generated in different directions; and
a controlling process moving the game characters in the activity space in response to an operation signal input from the controller; and
a rendering process rendering the game screen including the activity space and the game characters and displaying the game screen on the monitor,
wherein the activity space generating process generates the activity space both in a planar direction and in a height direction, and
wherein the activity space generating process comprises a leveling process forming a slope object shaped like a slope or a staircase on a level difference when the height of the level difference is equal to or lower than a predetermined height, and the leveling unit setting an elevator object for elevating and lowering when the height of the level difference is higher than the predetermined height.

10. The non-transitory computer-readable storage medium according to claim 9,
wherein the activity space generating process selects a diverging point and expands the activity space from the diverging point when the activity space generating unit has generated the activity space to a maximum point,
wherein the diverging point is selected from any point in the activity space from the starting point to the maximum point before the activity space is expanded, and
wherein the maximum point is at predetermined maximum distance from the starting point.

11. The non-transitory computer-readable storage medium according to claim 9,
wherein the activity space generating process generates the activity space on a map unit basis, the map unit having predetermined size, and
wherein the activity space generating process selects a first point in the activity space and generates the activity space from the first point to a second point when the first point is connected to the second point in the activity space by generating the activity space with the predetermined number of map units.

12. The non-transitory computer-readable storage medium according to claim 11,
wherein the predetermined number of map units is three or more.

* * * * *